(12) United States Patent
Lee et al.

(10) Patent No.: US 8,111,314 B2
(45) Date of Patent: Feb. 7, 2012

(54) CAMERA-ENABLED PORTABLE TERMINAL AND METHOD FOR TAKING MULTI-IMAGE PHOTOGRAPH USING THE SAME

(75) Inventors: Seok Gon Lee, Gumi-si (KR); Soon Jin Kim, Daegu Metropolitan (KR); Jae Gon Son, Buk-gu Daegu Metropolitan (KR); Ki Tae Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 711 days.

(21) Appl. No.: 11/642,930

(22) Filed: Dec. 21, 2006

(65) Prior Publication Data
US 2007/0263071 A1    Nov. 15, 2007

(30) Foreign Application Priority Data
Mar. 28, 2006    (KR) ................. 10-2006-0028067

(51) Int. Cl.
*H04N 5/225*    (2006.01)
(52) U.S. Cl. .......... 348/333.02; 348/207.99; 348/333.05
(58) Field of Classification Search .................. None
See application file for complete search history.

(56) References Cited

U.S. PATENT DOCUMENTS

| | | | |
|---|---|---|---|
| 4,827,347 A * | 5/1989 | Bell | 348/333.05 |
| 6,593,938 B1 * | 7/2003 | Sakata et al. | 345/629 |
| 2003/0025803 A1 | 2/2003 | Nakamura et al. | |
| 2003/0058255 A1 * | 3/2003 | Yamagishi | 345/619 |
| 2003/0125080 A1 | 7/2003 | Shimamura | |
| 2004/0002302 A1 | 1/2004 | Takemoto et al. | |
| 2004/0023685 A1 | 2/2004 | Nakamura | |
| 2005/0174451 A1 | 8/2005 | Nozaki et al. | |

* cited by examiner

*Primary Examiner* — David Ometz
*Assistant Examiner* — Angel L Garces-Rivera
(74) *Attorney, Agent, or Firm* — Roylance, Abrams, Berdo & Goodman, LLP (57) ABSTRACT

The present invention relates to a camera-enabled portable terminal having a function for taking a multi-image photograph. The camera-enabled portable terminal includes a camera module for capturing one or more images of an object; a display unit for displaying a frame partitioned into a preset number of windows in the multi-image photographing mode, each window being in any of a blank status, a preview status, and a filled-out status; a video processing unit for processing the image taken by the camera module to be fit to one or more of the windows; and a control unit for controlling the camera module, video processing unit, and the display unit such that the frame is displayed on the display unit together with information on the status of the windows.

6 Claims, 6 Drawing Sheets

CAMERA-ENABLED PORTABLE TERMINAL AND METHOD FOR TAKING MULTI-IMAGE PHOTOGRAPH USING THE SAME

CROSS REFERENCE TO RELATED APPLICATIONS

This application claims the benefit under 35 U.S.C. §119 (a) of Korean Patent Application No. 2006-0028067, filed Mar. 28, 2006, in the Korean Intellectual Property Office, the entire disclosure of which is hereby incorporated by reference.

BACKGROUND OF THE INVENTION

1. Field of the Invention

The present invention relates to a camera-enabled portable terminal. More particularly, the present invention relates to a camera-enabled portable terminal and a method for taking multi-image photographs using the camera-enabled portable terminal.

2. Description of the Related Art

A portable terminal is an electronic device implemented with functions, such as wireless communications, using various application programs. Exemplary portable terminals include Personal Mobile Communication Services Terminals, Personal Digital Assistants (PDAs), Smart Phones, International Mobile Telecommunication 2000 (IMT-2000) terminals, and wireless local area network (WLAN) terminals.

Portable terminals have been developed to support various services such as video communications, electronic diaries, voice and image recording, Internet access, and entertainment. In recent years, portable terminals equipped with digital cameras have become widely used. Portable terminals equipped with digital cameras enable the user to take motion or still pictures, use the taken pictures as background images of the terminal's display, and transmit the images to other devices.

For such purposes, the portable terminal is provided with a camera for capturing images and a display module for displaying the image captured by the camera. The camera may be implemented with either a charge coupled device (CCD) or a complementary metal oxide semiconductor (CMOS) sensor, and the display module may be implemented with a liquid crystal display (LCD).

Recently, portable terminals have been equipped with a camera that is capable of taking photos and displaying more than one of photos on a single screen of the display module at the same time.

Figure 1:
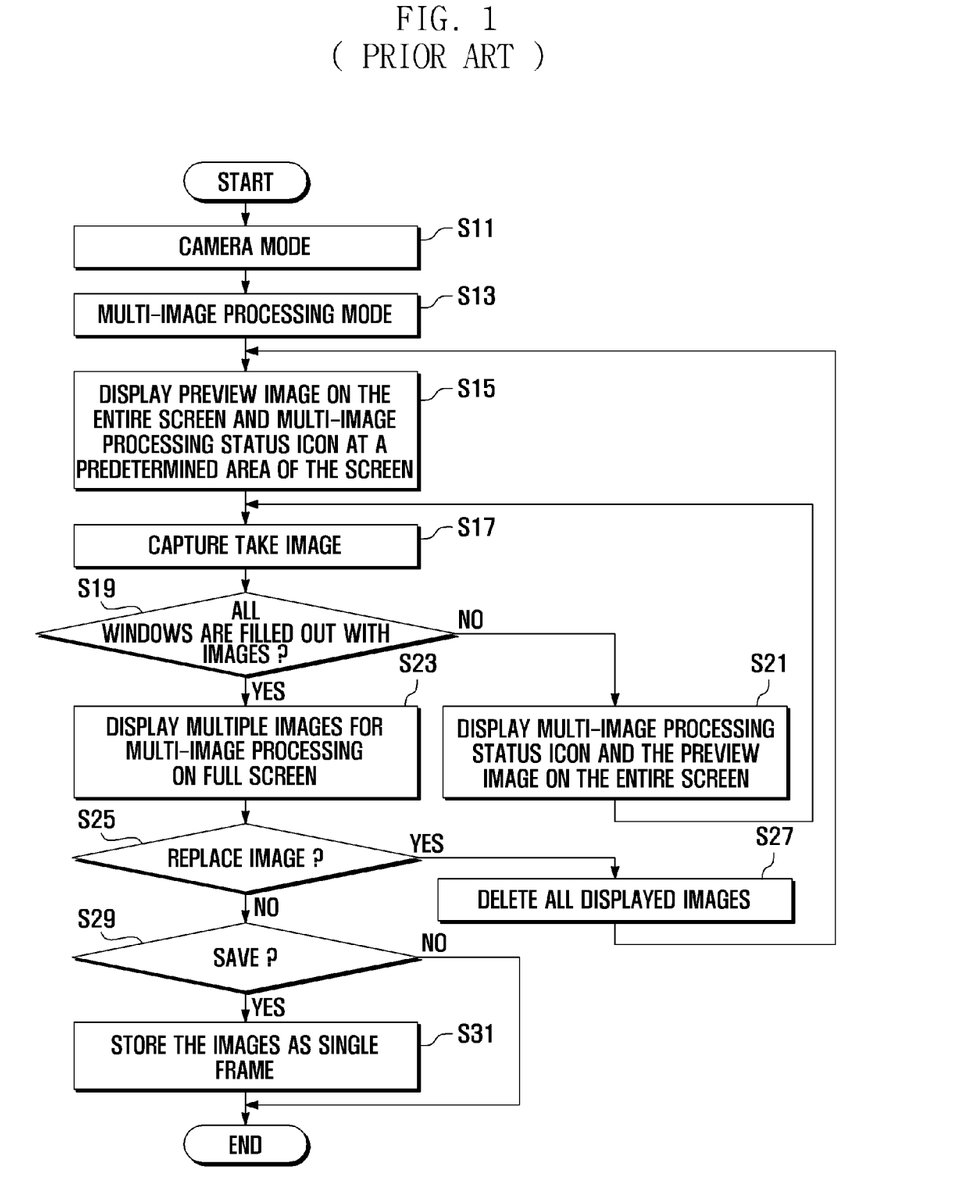
FIG. 1 is a flowchart for explaining a multi-image photographing method of the conventional camera-enabled portable terminal.
Figure 2:
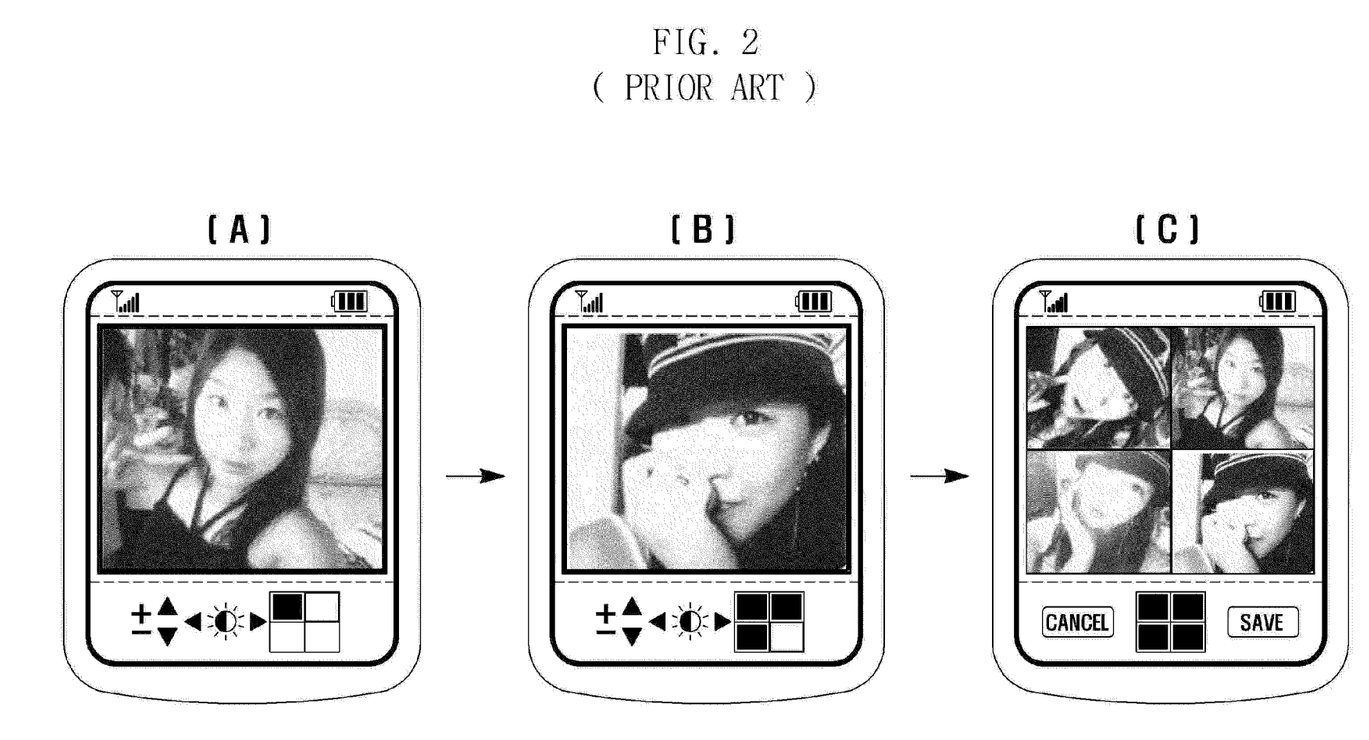
FIG. 2A to FIG. 2C are screen shots illustrating steps of processing the images taken by the camera-enabled portable terminal.

FIG. 1 is a flowchart for explaining a multi-image photographing method of the conventional camera-enabled portable terminal and FIG. 2A to FIG. 2C are screen shots illustrating steps of processing the images captured by the camera-enabled portable terminal.

Referring to FIG. 1, the camera-enabled portable terminal enters a camera mode at step S11 and switches to a multi-image photographing mode upon a multi-image processing command being inputted at step S13. In the multi-image photographing mode, the portable terminal displays a preview image, taken by the camera, on the full screen of the display module and shows a status indication icon at a predetermined area at step S15. The status indication icon shows the operational status of the multi-image photographing mode. An exemplary predetermined area includes the side or bottom area of the screen. The status indication icon is shown at the bottom area of the screen in FIG. 2A to FIG. 2C.

Once a photographing command is inputted, while the preview image and the multi-image processing icon are presented on the screen, the preview image is captured at step S17. Whenever an image is captured, the portable terminal determines whether or not the number of images captured by the portable terminal is equal to the number of the windows formed by partitioning the screen at step S19. If it is determined that the number of images is not equal to the windows, the portable terminal displays the status indication icon representing the present status of the respective windows, as shown in FIG. 2A and FIG. 2B, and displays the preview image on the whole screen at step S21.

On the other hand, if it is determined that the number of images is equal to the number of windows, the portable terminal displays the images filled out in the respective windows on the whole screen as shown in FIG. 2C at step S23. After all the images for filling out the windows are captured, the portable terminal determines whether or not a frame refresh command is inputted while the images are displayed on the screen at step S25. If there is no frame refresh command, the portable terminal determines whether or not a save command is inputted at step S29. If the save command is inputted, the portable terminal saves the images filled out in the windows as a single frame at step S31.

If the frame refreshment command is inputted at step S25, the portable terminal clears the images displayed on the screen at step S27 and carries out steps of S15 to S25.

However, the conventional multi-image photographing method of the camera-enabled portable terminal has a drawback in that it is impossible to check the respective images before all of the images for filling out the windows are captured. This is because all the images captured for forming a single frame are displayed and checked after all the images are captured.

Also, in the conventional multi-image photographing method of the camera-enabled portable terminal, all the images captured for filling out the frame are discarded and retaken even when only one image is required to be changed since a refresh is performed on a frame basis.

Accordingly, there is a need for an improved multi-image photographing method and camera-enabled portable terminal that is capable of processing respective images for the formation of a single frame, and is capable of independently editing the images constituting a frame after all the images are framed on the screen.

SUMMARY OF THE INVENTION

Exemplary embodiments of the present invention address at least the above problems and/or disadvantages and provide at least the advantages described below. Accordingly, an aspect of the present invention is to provide a camera-enabled portable terminal and a multi-image photographing method using the terminal, which is capable of processing respective images for forming a single frame image.

It is another exemplary aspect of the present invention to provide a camera-enabled portable terminal and a multi-image photographing method using the terminal, which is capable of editing independently editing the images constituting a frame even after all the images are framed on the screen.

In one exemplary aspect of the present invention, the above and other objects can be accomplished by the provision of a camera-enabled portable terminal supporting a multi-image photographing mode. The camera-enabled portable terminal includes a camera module for capturing one or more images of an object; a display unit for displaying a frame partitioned into a preset number of windows in the multi-image photographing mode, each window being in any of a blank status, a preview status, and a filled-out status; a video processing unit for processing the image taken by the camera module to be fit to one or more of the windows; and a control unit for controlling the camera module, video processing unit, and the display unit such that the frame is displayed on the display unit together with information on the status of the windows.

Preferably, the control unit determines whether or not a deletion command is inputted for a specific window and controls to display the corresponding window in the blank status if the deletion command is inputted.

Preferably, the control unit controls the display unit to display 'save' and 'cancel' buttons for inputting save and cancel commands.

Preferably, the camera-enabled portable terminal further includes a storage unit for temporarily storing the images taken during the multi-image photographing mode.

Preferably, the camera-enabled portable terminal further includes multi-image photograph storage unit that stores the one or more images used to fill out the windows of the frame as a single multi-image photograph.

In another exemplary aspect of the present invention, the above and other objects can be accomplished by a method for taking multi-image photograph using a camera-enabled portable terminal. The method includes displaying a frame partitioned into a present number of windows and a status indication icon showing a status of respective windows in a multi-image photographing mode; defining each window in any of a blank status, a preview status, and a filled-out status, the status of respective windows being indicated by the status indication icon; taking and temporarily storing an image used in a window in a preview status as a photograph when a photographing command is inputted, the status indication icon reflecting the change of the corresponding window; and storing the images used to fill out the windows of the frame as a single multi-image photograph if a save command is inputted.

Preferably, the method further includes determining whether or not a replacement command is inputted for any of the windows in the filled-out status; deleting an image of a window if the replacement command is inputted; displaying a preview image in the window with the status indication icon reflecting a change to the preview status of the window; and taking the preview image as the photograph for the window with the status indication icon reflecting a change to the filled-out status of the window, when the photographing command is inputted.

Preferably, the step of storing the images includes determining whether or not all the windows are filled out; and storing the images filled out in the windows as the multi-image photograph if all the windows are filled out.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 3:
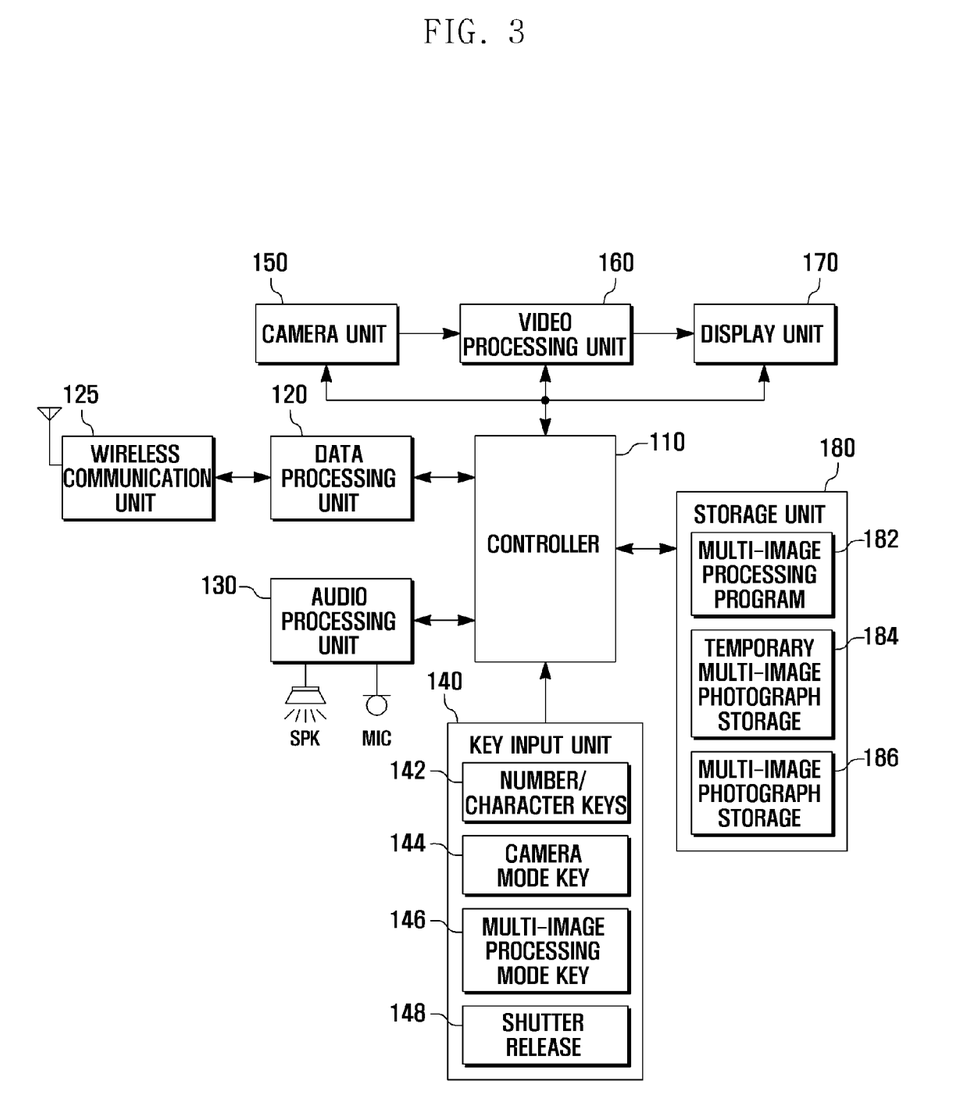
FIG. 3 is a block diagram illustrating a camera-enabled portable terminal according to an exemplary embodiment of the present invention.

FIG. 3 is a block diagram illustrating a camera-enabled portable terminal according to an exemplary embodiment of the present invention.

Referring to FIG. 3, the portable terminal includes a control unit 110, a data processing unit 120, a wireless communication unit 125, an audio processing unit 130, a key input unit 140, a camera unit 150, a video processing unit 160, a display unit 170, and a storage unit 180.

The control unit 110 controls the operation of the portable terminal and controls the multi-image processing and editing functions and camera unit 150 according to inputted commands. Also, the control unit 110 controls the display unit 170 to display a preview image, multi-image processing information, and a frame consisted of multiple images in a multi-image photographing mode.

The data processing unit 120 includes a transmission module for encoding and modulating signals to be transmitted through a wireless channel and a reception module for demodulating and decoding a signal received through the wireless channel. Also, the data processing unit 120 transmits the demodulated and decoded signal to the control unit 110 and outputs the encoded and modulated signal to the wireless communication unit 125 under the control of the control unit 110.

The wireless communication unit 125 is responsible for wireless data communication of the portable terminal. The wireless communication unit includes a radio frequency (RF) transmitter for up-converting and amplifying the signal to be transmitted and a RF receiver for low noise-amplifying and down-converting the received signal. The wireless communication unit 125 outputs the data received through the wireless channel to the data processing unit 120 and transmits the data received from the data processing unit 120 through the wireless channel.

The audio processing unit 130 includes a codec, which is provided with a data codec for processing data packets and an audio codec for processing audio signals such as voice. During the voice communication, the audio processing unit 130 converts the digital audio signal received through the data processing unit 120 into an analog signal using the audio codec and then outputs the analog signal through the speaker. Also, the audio processing unit 130 converts the analog audio signal inputted through a microphone into a digital audio signal using the codec and outputs the digital audio signal to the data processing unit 120 under the control of the control unit 110.

The key input unit 140 is provided with a plurality of keys 142 for inputting number and character information and function keys for manipulating the operation of the portable terminal. In this embodiment, the key input unit 140 includes a camera mode key 144, a multi-image photographing mode key 146, and a shutter key 148. The camera mode key 144 is for activating the operation of the camera, and the multi-image photographing mode key 146 is for entering the multi-image photographing mode for taking photos to be used for forming a frame image. Also, the shutter key 148 is for inputting a command for taking the preview image as a photograph. The camera mode key 144, multi-image photographing mode key 146, and shutter key 148 can be implemented as a software-supported single key.

The camera unit 150 includes a camera sensor for taking image via a lens and converting the optical image signal into an electrical signal. The camera unit 150 further includes a signal processor for converting the analog signal outputted from the camera sensor into a digital signal. An exemplary camera sensor is a charge coupled device (CCD) sensor and an exemplary signal processor is a digital signal processor (DSP). However, other types of camera sensors and signal processors may be used. Additionally, the camera sensor and the signal processor can be integrated as a single module.

The video processing unit 160 generates video data to be displayed on the screen with the image signal outputted from the camera unit 150. The image processing unit 160 processes the video signal outputted from the camera unit 150 in units of a frame. The image processing unit 160 outputs the video signal in consideration of the display characteristics and size of the display unit 170. In this embodiment, the video processing unit 160 can partition the frame so as to display multiple images at the same time.

The video processing unit 160 is provided with a video codec which can compress the video frame data or decompress the compressed video frame data with predetermined settings. The video codec can be any of JPEG codec, MPEG codec, Wavelet codec. However, any other video codec may be used.

Also, the video processing unit 160 can be provided with an On Screen Display (OSD) function. In this case the video processing unit 160 can display operational status information at a predetermined area of the screen on the display unit 170 under the control of the control unit 110.

The display unit 170 displays the video data outputted from the video processing unit 160 and the information provided by the control unit 110. The display unit 170 can be a Liquid Crystal Display (LCD). In this case, the display unit 170 has an LCD controller, a memory dedicated for storing the video data, and an LCD device. The LCD can be implemented with a touch screen mechanism such that the display unit 170 can be used as an input device. In this embodiment, the screen of the display unit 170 is partitioned, in the multi-image photographing mode, so as to form a predetermined number of windows that show the preview images taken by the camera unit and outputted from the video processing unit 160. Also, the display unit 170 displays the multi-image processing icon which informs of the image processing status, at one side of the screen.

Figure 4:
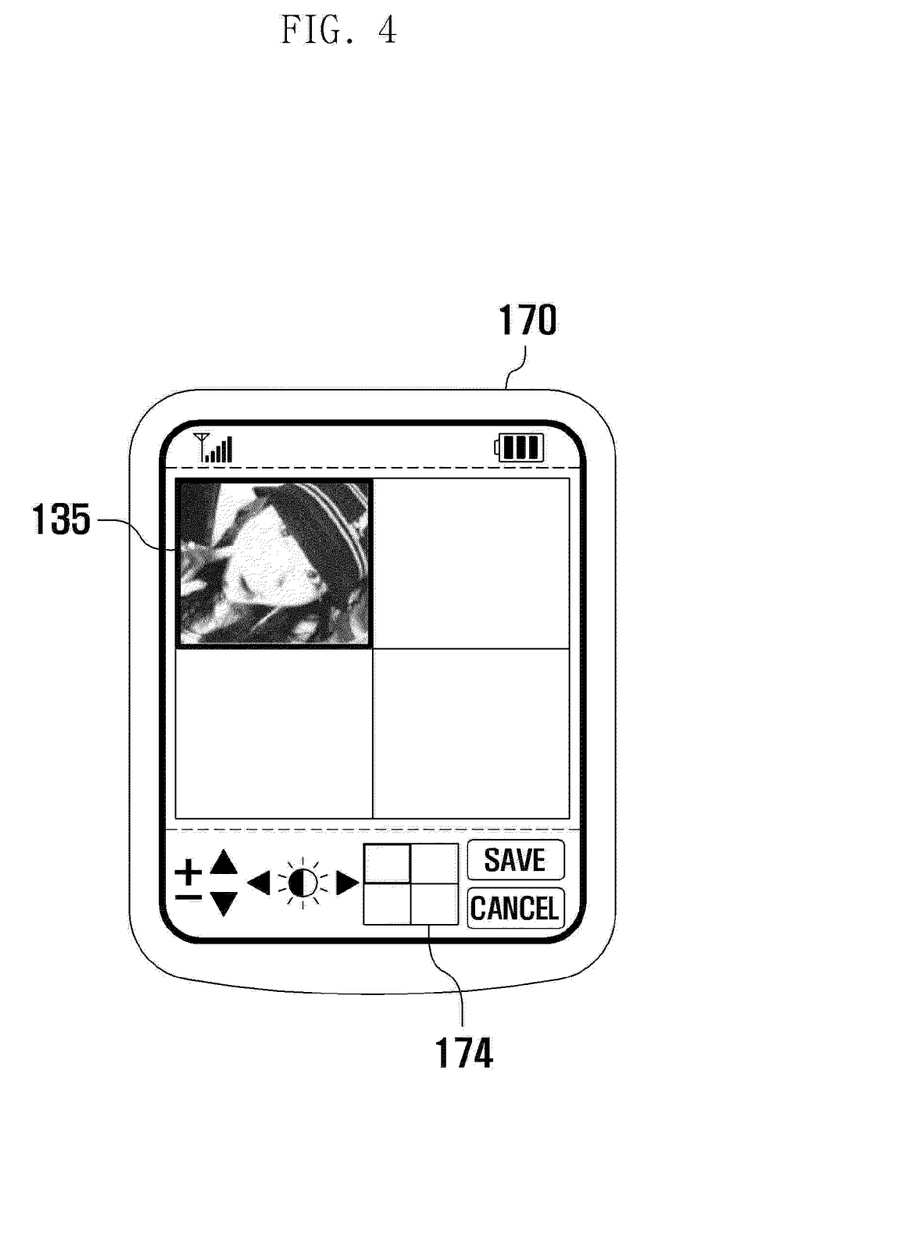
FIG. 4 is a screen shot of the display unit on which one of the windows constituting a frame is filled out in a multi-image photographing mode according to an exemplary embodiment of the present invention.

FIG. 4 is a screen shot of the display unit on which one of the windows constituting a frame is filled out in a multi-image photographing mode according to an exemplary embodiment of the present invention.

As shown in FIG. 4, the display unit 170 shows the screen which is partitioned into a predetermined number of windows. A window 135 is filled out with an image, which is indicated by the status indication icon 174 displayed at the bottom of the screen.

Note that the images are taken in a sequential order from left top to right bottom windows and the status indication icon has blocks for reflecting the status of the respective windows such that the block corresponding to the window filled out with a photograph is expressed in black. The status of each window can be any of a blank status, a preview status, and a photograph filled-out status.

The storage unit 180 stores the programs operated by the portable terminal and the data generated by the operations of the programs. In this embodiment, the storage unit 180 stores the multi-image processing program 182 and includes a temporary multi-image photograph storage 184 for temporarily storing the images taken in the multi-image photographing mode and a multi-image photograph storage 186 for storing the images checked and edited while in the temporary storage and on the screen.

FIG. 5A to FIG. 5H are screen shots illustrating steps of multi-image photographing method according to an exemplary embodiment of the present invention.

Referring to FIG. 5A to FIG. 5H, the control unit 110 displays the frame partitioned into a preset number of windows of which the left top one is filled out with an image and a status indication icon representing the multi-image photograph processing status at the bottom of the screen. Here, the control unit 110 displays a preview image at the first window of the frame and the status indication icon which informs that the first window is in a preview status.

Figure 5:
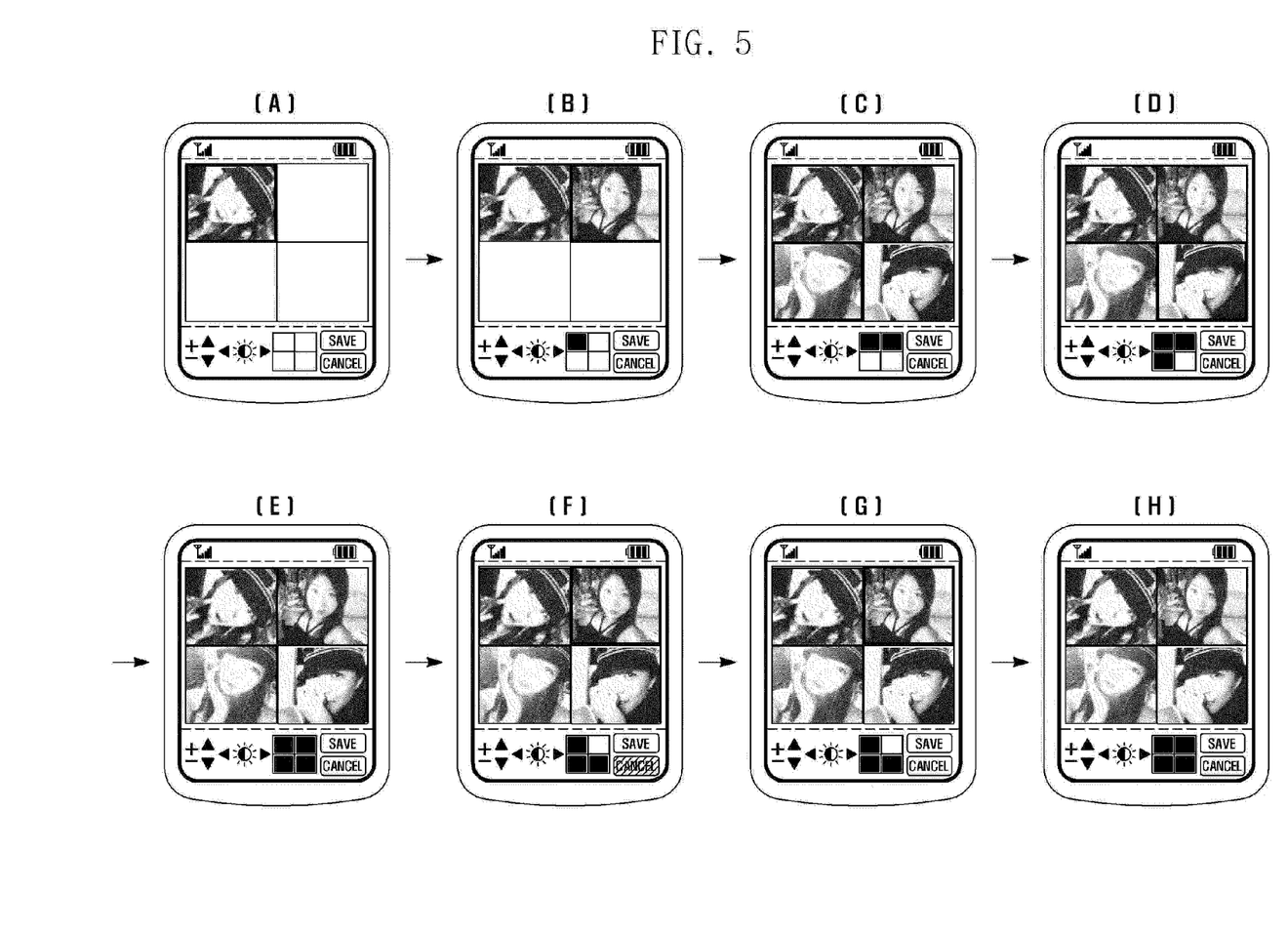
FIG. 5A to FIG. 5H are screen shots illustrating steps of multi-image photographing method according to an exemplary embodiment of the present invention.

If a photographing command is inputted while the screen of FIG. 5A is displayed, the control unit 110 takes the preview image as a first photograph and displays another preview image at the second window of the frame, as shown in FIG. 5b. Also, the control unit 110 provides the status indication icon which informs that the first window is filled out by a first photograph and the second window is in the preview status.

If the photographing command is inputted while the screen of FIG. 5B is displayed, the control unit 110 takes the preview image shown in the second window as a second photograph and displays another preview image at the third window of the frame, together with the status indication icon, at the bottom of the screen. The status indication icon informs that the first and second windows are filled out by the first and second photographs and the third window is in the preview status, as shown in FIG. 5C.

If the photographing command is inputted while the screen of FIG. 5C is displayed, the control unit 110 takes the preview image shown in the third window as a third photograph and displays another preview image at the fourth window of the frame, together with the status indication icon. The status indication icon informs that the first, second, and third windows are filled out by respective photographs and the fourth window is in the preview status, as shown in FIG. 5D.

If the photographing command is inputted while the screen of FIG. 5D is displayed, the control unit 110 takes the preview image shown in the fourth window as a fourth photograph and displays the screen of the four windows filled out with the photographs together with the status indication icon which informs that the four windows are filled out, as shown in FIG. 5E.

After completing the loading of the photographs onto the respective windows, if a change command is inputted for changing the photograph taken in a specific one among the four windows (second window in this embodiment), the control unit 110 deletes the photograph of the second window and informs of the deletion of the second window with the status indication icon a shown in FIG. 5F. Sequentially, the control unit 110 displays another preview image in the second window, which is indicated with the status indication icon as shown in FIG. 5G.

Note that the window from which the photograph is deleted could be indicated with green window frame and the window of the preview status could be indicated with yellow window frame.

If the photographing command is inputted while the screen of FIG. 5G is displayed, the control unit 110 takes the preview image shown in the second window as the second photograph and displays the screen having the four windows filled out with the photographs together with the status indication icon as shown in FIG. 5H. That is, the photographs on the screen can be independently changed and edited according to an exemplary embodiment of the present invention.

Figure 6:
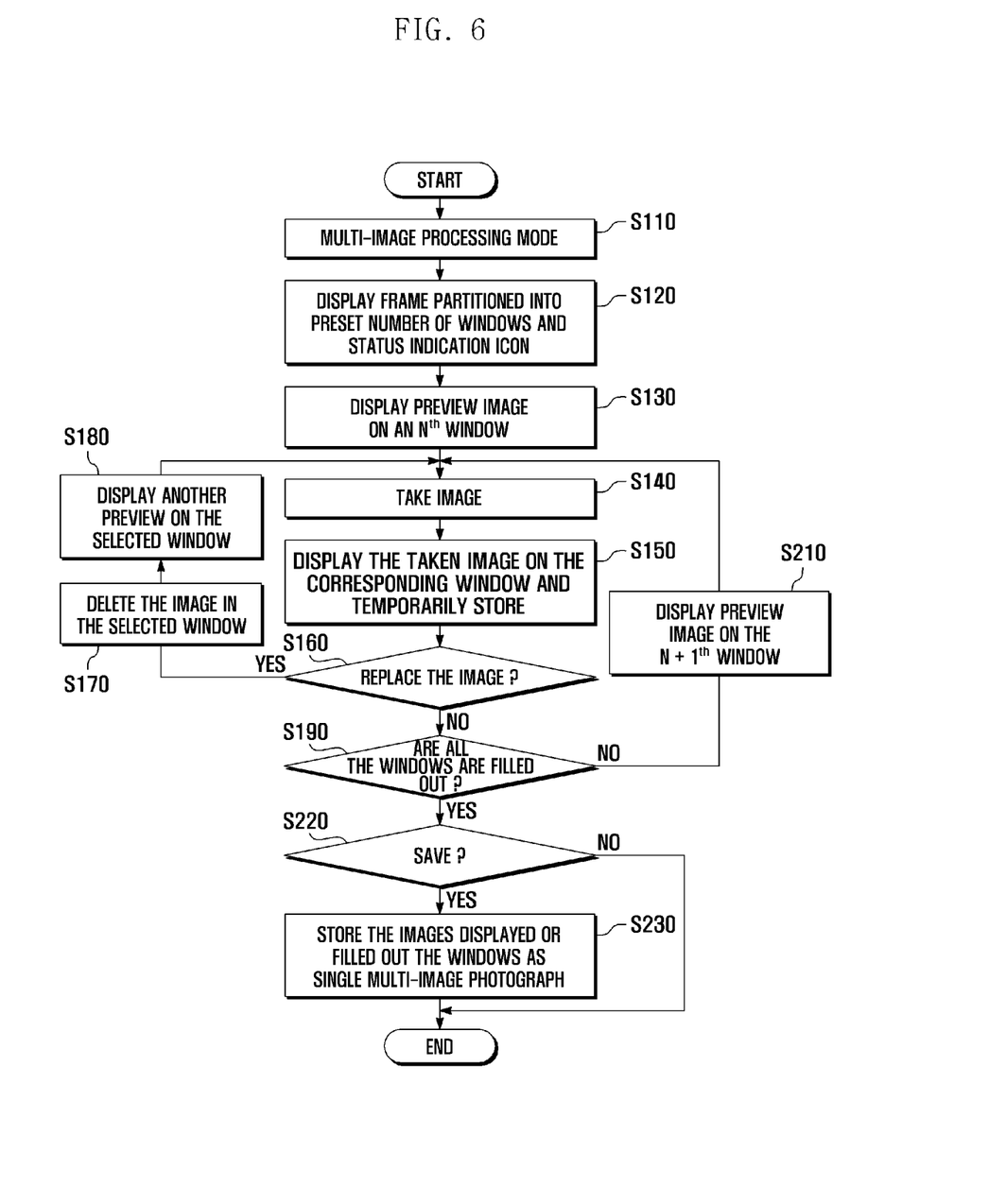
FIG. 6 is a flowchart for explaining a multi-image photographing method using the camera-enable portable terminal according to an exemplary embodiment of the present invention.

FIG. 6 is a flowchart for explaining a multi-image photographing method using the camera-enable portable terminal according to an exemplary embodiment of the present invention.

Referring to FIG. 6, once the camera-enabled portable terminal enters the multi-image photographing mode as a result of a key manipulation at step S110, the control unit 110 displays a frame consisting of a preset number of windows together with a status indication icon at the bottom of the screen, at step S120.

In the multi-image photographing mode, the control unit 110 displays the frame having a preview image on an $n^{th}$ window, which is indicated by the status indication icon at step S130.

It is preferred that the images are taken in a sequential order from left top to right bottom windows and that the status indication icon has blocks reflecting the status of the respective windows such that the block corresponding to the window filled out with a photograph is expressed in black.

If a photographing command is inputted while the preview image is displayed, the control unit 110 takes the preview image as a photograph at step S140 and temporarily registers the photograph onto the corresponding window at step S150. Here, the status indication icon indicates the photograph filled-out status of the window with a black block.

Sequentially, the control unit 110 determines whether or not there is an input command for replacing the photograph registered to the window at step S160. If a replacement command is inputted, the control unit 110 deletes the registered photograph at step S170 and displays another preview image onto the window at step S180 and performs the steps S140 to S160.

If there is no replacement command at step S160, the control unit 110 determines whether or not all the windows are filled out with the photographs at step S190. If it is determined that all the windows are not filled out, the control unit 110 displays a preview image on the n+$1^{th}$ window and the status indication icon informing the preview status of the corresponding window at step S210. And then, the control unit 110 performs the steps S140 to S190.

On the other hand, if all the images are filled out, the control unit 110 determines whether or not a save command is inputted at step S220. If the save command is inputted, the control unit stores the images filled out the windows of the frame as a multi-image photograph at step S230.

As described above, the multi-image photographing technique of exemplary embodiments of the present invention is advantageous in that the images to be saved as a single multi-image photograph can be independently replaced or edited while taking the respective images. Also, the multi-image photographing technique of exemplary embodiments of the present invention facilitates to take a multi-image photograph since it enables the user to replace or edit the respective images at anytime through the whole multi-image photographing process.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A camera-enabled portable terminal supporting a multi-image photographing mode comprising:
   a camera module for capturing one or more images of an object;
   a touch screen for displaying a screen having a frame partitioned into a preset number of windows in the multi-image photographing mode, each window being in any of a blank status, a preview status, and a filled-out status, a status indication icon showing the status of the windows, and a cancel button for inputting a deletion command, the frame, the status indication icon and the cancel button being distinct from each other on the screen;
   a video processing unit for processing the image captured by the camera module to be fit to one or more of the windows; and
   a control unit for controlling the camera module, the video processing unit, and the touch screen, the control unit for determining whether or not the deletion command is inputted for a specific window in the filled-out status, deleting the image of the specific window if the deletion command is inputted for the specific window, changing the status indication icon of the specific window from the filled-out status to the blank status, and displaying another image on the specific window in the preview status.

2. The camera-enabled portable terminal of claim 1, wherein the control unit controls the touch screen to display a save button for inputting a save command.

3. The camera-enabled portable terminal of claim 1 further comprising a storage unit for temporarily storing the images captured during the multi-image photographing mode.

4. The camera-enabled portable terminal of claim 1 further comprising multi-image photograph storage unit that stores the one or more images used to fill out the windows of the frame as a single multi-image photograph.

5. A method for capturing multi-image photograph using a camera-enabled portable terminal, comprising:
   displaying a screen having a frame partitioned into a preset number of windows, a status indication icon showing a status of respective windows, and a cancel button for inputting a deletion command in a multi-image photographing mode, the frame, the status indication icon and the cancel button being distinct from each other on the screen;

defining each window in any of a blank status, a preview status, and a filled-out status, the status of respective windows being indicated by the status indication icon;

capturing and temporarily storing an image used in a window in a preview status as a photograph when a photographing command is inputted;

changing the status indication icon of the corresponding window from the preview status to a filled-out status;

storing the captured images used to fill out the windows of the frame as a single multi-image photograph if a save command is inputted;

determining whether or not the deletion command is inputted for a specific window in the filled-out status if the save command is not inputted;

deleting the image of the specific window if the deletion command is inputted for the specific window;

changing the status indication icon of the specific window from the filled-out status to a blank status; and displaying another image on the specific window in the preview status.

6. The method of claim 5, wherein the step of storing the images includes:

determining whether or not all the windows are filled out; and storing the images filled out in the windows as the multi-image photograph if all the windows are filled out.

\* \* \* \* \*